US009184963B2

(12) United States Patent
Stadelmeier et al.

(10) Patent No.: US 9,184,963 B2
(45) Date of Patent: Nov. 10, 2015

(54) TRANSMITTING DEVICE, RECEIVING DEVICE AND COMMUNICATION METHOD FOR AN OFDM COMMUNICATION SYSTEM WITH NEW PREAMBLE STRUCTURE

(71) Applicant: Sony Deutschland GmbH, Stuttgart (DE)

(72) Inventors: Lothar Stadelmeier, Stuttgart (DE); Markus Zumkeller, Schwaikheim (DE); Andreas Schwager, Kernen (DE); Stephen Tiedemann, Stuttgart (DE); Gralf Gaedeken, Burgwedel-Kleinburgwedel (DE)

(73) Assignee: SONY DEUTSCHLAND GmbH, Stuttgart (DE)

( * ) Notice: Subject to any disclaimer, the term of this patent is extended or adjusted under 35 U.S.C. 154(b) by 0 days.

(21) Appl. No.: 14/481,332

(22) Filed: Sep. 9, 2014

(65) Prior Publication Data
US 2015/0003567 A1    Jan. 1, 2015

Related U.S. Application Data

(60) Division of application No. 13/596,699, filed on Aug. 28, 2012, now abandoned, which is a continuation of application No. 11/908,140, filed as application No. PCT/EP2006/003986 on Apr. 28, 2006, now Pat. No. 8,325,827.

(30) Foreign Application Priority Data

Apr. 29, 2005    (EP) .................................... 05009490

(51) Int. Cl.
*H04L 27/20*    (2006.01)
*H04L 5/00*    (2006.01)
(Continued)

(52) U.S. Cl.
CPC ............ *H04L 27/2032* (2013.01); *H04B 3/542* (2013.01); *H04L 5/005* (2013.01);
(Continued)

(58) Field of Classification Search
CPC ... H04L 5/0048; H04L 5/0053; H04L 5/0007; H04L 27/2675
See application file for complete search history.

(56) References Cited

U.S. PATENT DOCUMENTS

| 2002/0085653 A1 | 7/2002 | Matsuoka et al. |
| 2002/0102940 A1 | 8/2002 | Bohnke et al. |

(Continued)

FOREIGN PATENT DOCUMENTS

| EP | 1 158 709 A1 | 11/2001 |
| EP | 1 168 746 A2 | 1/2002 |

(Continued)

OTHER PUBLICATIONS

"IEEE Standard 802, 11a Part 11: Wireless LAN Medium Access Control (MAC) and Physical Layer (PHY) specifications:" pp. 1-82, 1999.

(Continued)

*Primary Examiner* — Aristocratis Fotakis
(74) *Attorney, Agent, or Firm* — Oblon, McClelland, Maier & Neustadt, L.L.P.

(57) ABSTRACT

A transmitting device, a receiving device, and a communication method for transmitting and receiving data modulated on frequency subcarriers of an OFDM communication system. An OFDM burst includes a preamble part and payload data part, whereby the preamble includes a section of pilot symbols mapped onto every n-th frequency subcarrier and signaling data mapped onto the frequency subcarriers between the frequency subcarriers with the pilot symbols. A first channel estimation on the basis of the received pilot symbols is performed, the result of which is used to reconstruct the entire section of the received preamble as a training pattern for an accurate channel estimation, which is used for a channel equalization of the received payload part.

9 Claims, 3 Drawing Sheets

(51) Int. Cl.
  *H04L 27/26* (2006.01)
  *H04B 3/54* (2006.01)
  *H04L 25/02* (2006.01)
  *H04L 25/03* (2006.01)

(52) U.S. Cl.
  CPC ........... *H04L 5/0007* (2013.01); *H04L 5/0048* (2013.01); *H04L 5/0053* (2013.01); *H04L 27/2613* (2013.01); *H04B 2203/5425* (2013.01); *H04L 25/0204* (2013.01); *H04L 25/03006* (2013.01); *H04L 27/2655* (2013.01)

(56) References Cited

U.S. PATENT DOCUMENTS

| | | |
|---|---|---|
| 2002/0122471 A1 | 9/2002 | Ling |
| 2003/0072395 A1 | 4/2003 | Jia et al. |
| 2003/0215021 A1 | 11/2003 | Simmonds |
| 2004/0001563 A1 | 1/2004 | Scarpa |
| 2004/0170237 A1 | 9/2004 | Chadha et al. |
| 2004/0187156 A1 | 9/2004 | Palm et al. |
| 2004/0190560 A1* | 9/2004 | Maltsev et al. ............... 370/503 |
| 2004/0240376 A1 | 12/2004 | Wang et al. |
| 2005/0041761 A1 | 2/2005 | Chen et al. |
| 2005/0141626 A1* | 6/2005 | Lee et al. ....................... 375/260 |
| 2005/0181800 A1 | 8/2005 | Trachewsky et al. |
| 2005/0249244 A1 | 11/2005 | McNamara et al. |
| 2005/0265219 A1 | 12/2005 | Murphy et al. |
| 2006/0072529 A1 | 4/2006 | Mujtaba |
| 2010/0041433 A1 | 2/2010 | Stadelmeier et al. |
| 2013/0003818 A1 | 1/2013 | Stadelmeier et al. |
| 2014/0016715 A1 | 1/2014 | Stadelmeier et al. |

FOREIGN PATENT DOCUMENTS

| | | |
|---|---|---|
| JP | 2001-008257 | 1/2001 |
| JP | 2001-69117 | 3/2001 |
| JP | 2001-352311 | 12/2001 |
| JP | 2003-060632 | 2/2003 |
| JP | 2003-110460 | 4/2003 |
| JP | 2003-333010 | 11/2003 |
| JP | 2004-72469 | 3/2004 |
| JP | 2004-357339 | 12/2004 |
| JP | 2005-012683 | 1/2005 |
| JP | 2005-57644 | 3/2005 |
| WO | 03 034646 | 4/2003 |
| WO | 2004-032375 | 4/2004 |
| WO | 2004-036861 A2 | 4/2004 |
| WO | 2004-107690 | 12/2004 |
| WO | 2005-036791 | 4/2005 |

OTHER PUBLICATIONS

Langton (Orthogonal Frequency Division Multiplex Tutorial, OFDM, 2004).
Office Action issued Aug. 26, 2010 in Chinese Application No. 200680014545.1 filed Apr. 28, 2006.
European Patent Office Action dated Dec. 9, 2010.
Office Action issued Dec. 27, 2010, in State Intellectual Property Office, P.R. China, Patent Application No. 200680014545.1, Application Date Apr. 28, 2006 (with English-language Translation).
Japanese Office Action issued Apr. 9, 2013, in Japan Patent Application No. 2008-508164 (with English translation).
Office Action issued Nov. 3, 2011 in European Patent Convention No. 10 150 649.1-2415, filed Apr. 29, 2005.
European Patent Office Search Report dated Dec. 10, 2010.
Japanese Office Action issued on Jan. 18, 2012 in Patent Application No. 2008-508164 (English translation only).
Japanese Office Action issued on Jun. 19, 2012 in Japanese Patent Application No. 2008-508164 (with English translation).
Teng, Yuanrun, et al., "An Efficient Transmission Method of Adaptive Modulation Information for Grouping Adaptive Modulation OFDM System", vol. 102, No. 24, Apr. 12, 2002, pp. 87-92.
Office Action issued Nov. 6, 2012, in Japanese Patent Application No. 2008-508164 with English Summary translation.
Communication under Rule 71(3) EPC issued Dec. 6, 2012, in European Patent Application No. 10 011 886.8-2415.
Communication under Rule 71(3) EPC issued Dec. 6, 2012, in European Patent Application No. 10 150 649.1-2415.
Masafumi Ito, et al., "Decision Directed Channel Estimation Method for Scattered Pilot OFDM Signal in Fast Varying Fading Environments", The Institute of Electronics Information and Communication Engineers Technical Report of IEICE, vol. 102, No. 201, RCS2002-104, Jul. 10, 2002, pp. 85-90 with English Abstract.
Tomohiro Hiramoto, et al., "Low Correlative Adaptive Array Antenna with Decision Feedback using Interpolation of Weights in OFDM Systems", The Institute of Electronics Information and Communication Engineers Technical Report of IEICE, vol. 103, No. 720, CS2003-175, Mar. 8, 2004, pp. 99-104 with English Abstract.

\* cited by examiner

TRANSMITTING DEVICE, RECEIVING DEVICE AND COMMUNICATION METHOD FOR AN OFDM COMMUNICATION SYSTEM WITH NEW PREAMBLE STRUCTURE

CROSS REFERENCE TO RELATED APPLICATIONS

This application is a division of U.S. Ser. No. 13/596,699, filed Aug. 28, 2012, which is a continuation of and is based upon and claims the benefit of priority under 35 U.S.C. §120 to U.S. Ser. No. 11/908,140, filed Sep. 10, 2007, now U.S. Pat. No. 8,325,827, the entire contents of each which are incorporated herein by reference. U.S. Ser. No. 11/908,140 is the national stage of PCT/EP2006/003986 filed Apr. 28, 2006, and claims the benefit of priority under 35 U.S.C. §119 from European Patent Application No. 05 009 490.3, filed Apr. 29, 2005.

BACKGROUND OF THE INVENTION

1. Field of the Invention

The present invention relates to a transmitting device, to a receiving device and to a communication method for transmitting and receiving signals modulated on frequency subcarriers of an OFDM (Orthogonal Frequency Division Multiplexing) communication system.

2. Description of the Related Art

In bi-directional burst-oriented digital communication systems there is the need to synchronize a receiving device to a data burst coming from a transmitting device. This is true for wired as well as wireless communication systems. Generally, in order to perform signal detection, AGC (Automatic Gain Control) adjustment, frequency offset estimation, timing synchronization and channel equalization on the receiving side, preambles are used. A preamble is inserted either just before the payload data part of a burst or in the middle of a burst by a transmitting device and is processed on the receiving side in order to perform the mentioned functions.

In current burst oriented digital communication systems, in which a preamble is inserted just before the payload data part, the preamble can roughly be divided in three sections. The first section comprises information or symbols which are used on the receiving side for signal detection and automatic gain control as well as a coarse frequency and timing estimation. The second section comprises symbols and information used on the receiving side for channel estimation, fine frequency offset estimation and timing synchronization. The third section comprises information and symbols relating to additional signaling information such as the used modulation scheme, the packet length, service information and so forth. In OFDM communication systems, in which data or symbols are modulated on frequency subcarriers, the first section usually comprises some kind of auto-correlation pattern, i.e. pilot symbols which are modulated onto the frequency subcarriers, for example, sequences like CAZAC (Constant Amplitude Zero Auto-Correlation) are used. Hereby, the sequences with the pilot symbols are spread over the frequency subcarriers of an OFDM symbol, whereby all carriers in between the two modulated carriers with the pilot symbols are set to zero. The idea of these special pilot patterns is to get suited correlation patterns with high correlation maximums in order to achieve a first and coarse synchronization.

The automatic gain control information is usually placed before the auto-correlation pattern. In the second section, known OFDM symbols, i.e. training sequences or pilot patterns which are known to the receiver, are mapped onto the frequency subcarriers which allow a channel equalization as well as a fine frequency and timing synchronization. The third section comprising the additional signaling data, the specific content of which basically depends on the MAC (Media Access Control) architecture.

The general problem with preambles is that with increasing preamble length, i.e. increasing length of the various training and correlation patterns, the synchronization and channel estimation probability and liability gets better, on the other hand, the overall data throughput decreases since the ratio between the transmitted preamble data and the transmitted payload data is getting larger. Particularly, in a communication network with many active nodes and therefore a high number of data exchanges with many preambles, long preambles cause a significant decrease of the effective data rate.

The object of the present invention is therefore to provide a transmitting device, a receiving device and a communication method for transmitting and receiving signals modulated on frequency subcarriers of an orthogonal frequency division multiplexing communication system, whereby bursts comprising a preamble part and a payload part are transmitted, in which the preamble part is as short as possible while still guaranteeing the secure synchronization on the receiving side.

The above object is achieved by a transmitting device for transmitting signals modulated on frequency subcarriers of an orthogonal frequency division multiplexing (OFDM) communication system according to claim 1. The transmitting device according to the present invention is adapted to transmit OFDM bursts comprising a preamble part and a payload data part and comprises preamble generating means adapted to generate said preamble part with a section consisting of pilot symbols mapped onto every n-th frequency subcarrier and signaling data mapped onto the frequency subcarriers between frequency subcarriers with the pilot symbols. Hereby, $n=1, 2, 3, 4, 5, 6, \ldots$.

Advantageously, the pilot symbols form a cross-correlation pattern. In other words, the pilot symbols are known to the receiving side. Further advantageously, the preamble generating means modulates the signaling data of the mentioned section of the preamble part with a robust modulation scheme. Hereby, the robust modulation scheme is a modulation scheme in which symbols to be transmitted or mapped onto 2 or 4 constellation points of the modulation scheme. For example, the robust modulation scheme may be a BPSK or a QPSK modulation scheme. Alternatively, higher constellations with e.g. 8, 16, 32 or more constellation points can be used if the channel characteristics are good enough. Further advantageously, the preamble generating means provides the signaling data with a forward error correction in order to increase the probability of a correct decision at the decoder on the receiving side. Advantageously, the transmitting device of the present invention and its elements are adapted to transmit signals in a powerline communication system.

An example for such a forward error correction is the Viterbi code.

The above object is further achieved by a receiving device for receiving signals modulated on frequency subcarriers of an OFDM communication system according to claim 7. The receiving device according to the present invention is adapted to receive OFDM bursts comprising a preamble part and a payload data part, said preamble part comprising a section with pilot symbols mapped onto every n-th frequency subcarrier ($n=1, 2, 3, 4, 5, 6, \ldots$) and signaling data mapped onto the frequency subcarriers between the frequency subcarriers with the pilot symbols, and comprises channel estimation means adapted to perform a first channel estimation on the basis of said received pilot symbols, the result of which is used to reconstruct the entire section of the received preamble as a training pattern for an accurate channel estimation and first channel equalization means adapted to use the result of the accurate channel estimation for a channel equalization of the received payload part.

Advantageously, the channel estimation means is adapted to perform said accurate channel estimation by comparing the training pattern with the received section of the preamble part. Further advantageously, the first channel estimation result provided by the channel estimation means on the basis of the received pilot symbols is supplied to a second channel equalization means adapted to perform a channel equalization on the received signaling data. Hereby, the equalized signaling data is advantageously used to reconstruct the entire section of the received preamble as said training pattern for said accurate channel estimation.

Advantageously, the receiving device of the present invention and its elements are adapted to receive signals in a powerline communication system.

The above object is further achieved by a communication method for transmitting and receiving signals modulated on frequency subcarriers of an OFDM communication system according to claim 11. In the communication method of the present invention, OFDM bursts comprising a preamble part and a payload data part are transmitted, said preamble part having a section consisting of pilot symbols mapped onto every n-th frequency subcarrier (n=1, 2, 3, 4, 5, 6, ... ) and signaling data mapped onto the frequency subcarriers between the frequency subcarriers with the pilot symbols, and whereby a first channel estimation on the basis of the received pilot symbols are performed, the result of which is used to reconstruct the entire section of the received preamble as a training pattern for an accurate channel estimation, which is used for a channel equalization of the received payload part.

Advantageously, the accurate channel estimation is performed by comparing the training pattern with the received section of the preamble part. Further advantageously, the first channel estimation result is used to form a channel equalization on said received signaling data. Hereby, the equalized signaling data is advantageously used to reconstruct the entire section of the received preamble as the training pattern for said accurate channel estimation. The term 'signals' is meant to encompass all kinds of payload data, symbols, information, training patterns, pilot symbols etc. which can be transmitted and received in a wireless or wired communication system.

The present invention bases on the idea to minimize the number of preamble symbols by merging parts of all of the signaling data from the third section of the known preambles into the channel estimation pattern of the second section of the preamble. This is achieved by replacing the training data or pilot symbols in the specific frequency plots (frequency subcarriers) of each of the training symbols with signaling data, preferably in a robust constellation pattern, then deciding the transmitted data pattern after a coarse channel estimation derived from the remaining training pattern and finally re-using the decided data pattern to reconstruct the full training pattern or symbol over all the frequency subcarriers of the section of the preamble. Combining the channel equalization and signaling information in the same section of the preamble significantly shortens the overall preamble length. It is to be noted that the length of the preamble can be made shorter the more stable or static the transmission in a communication channel is. The synchronization in static or quasi-static channels is much easier than in fast-changing transmission channels since the attenuation and the phase shift remain stable over a long period of time so that less synchronization information is necessary. Additionally, a static or quasi-static channel opens possibilities to shorten the preamble since the automatic gain adjustment is much easier than in fast-changing channels. Generally, the present invention is advantageous for static or quasi-static communication channels, as in most wired communication systems, specifically power line communication systems, DSL communication systems and so forth. For example, in a power line communication system, the transmission channels are quasi-static, since except in events like the switching of lights and the plugging or unplugging of devices the channel characteristics remain stable. The same is true for communication systems using the wired telephone network. On the other hand, also wireless communication systems may have quasi-static channel characteristics, such as e.g. WLAN communication systems. The present invention is therefore not restricted to wired communication systems, but can also be applied to wireless communication networks.

BRIEF DESCRIPTION OF THE DRAWINGS

The present invention is explained in more detail in the following description in relation to the enclosed drawings, in which.

DETAILED DESCRIPTION OF THE PREFERRED EMBODIMENTS

Figure 1:
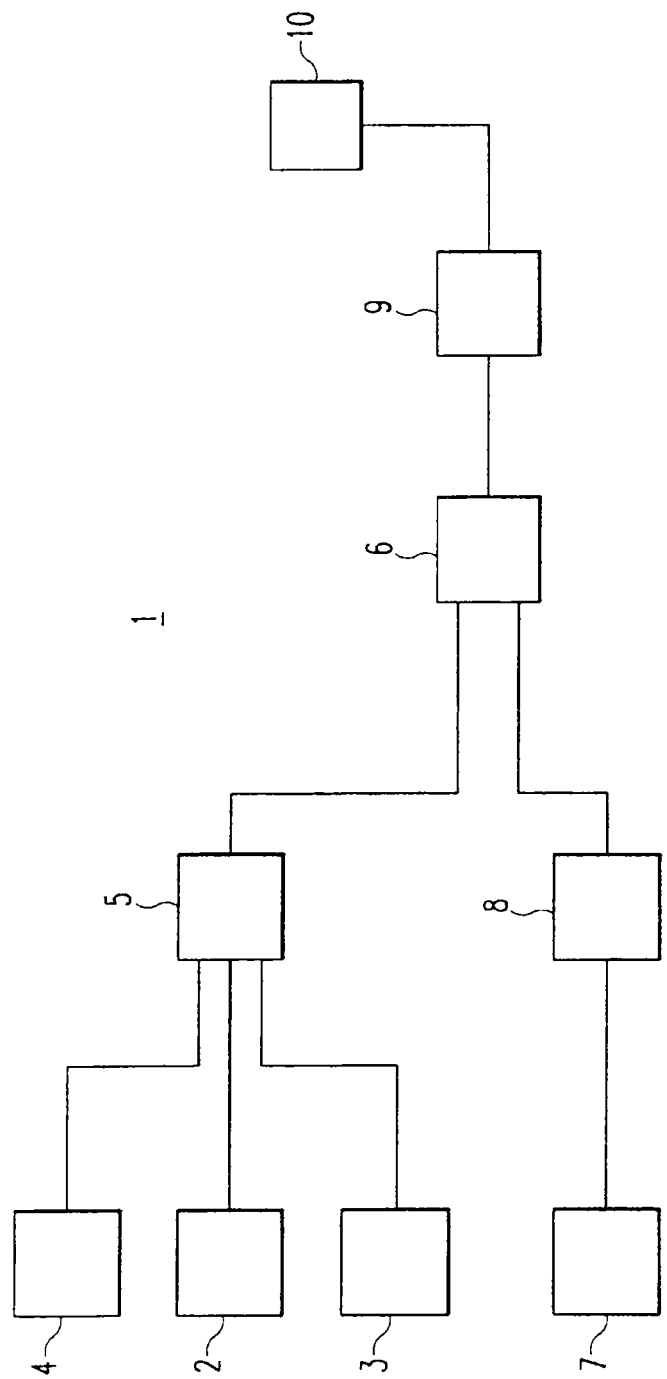
FIG. 1 shows a schematic block diagram of a transmitting device according to the present invention, FIG. 2 schematically shows the mapping of pilot symbols on every n-th subcarrier, FIG. 3 schematically shows a robust modulation scheme for the signaling data, and FIG. 4 schematically shows a block diagram of a receiving device according to the present invention.

FIG. 1 shows a schematic block diagram of a transmitting device 1 according to the present invention. The transmitting device 1 is adapted to transmit signals modulated on frequency subcarriers of an OFDM communication system and comprises all the means necessary for the preparation and processing of the signals and mapping of the signals onto the frequency subcarriers of the OFDM system and the transmission of the correspondingly formed OFDM bursts in the wired or wireless OFDM communication system. However, for the sake of clarity, only the elements and means necessary for the present invention are shown and explained in FIG. 1. The same is true for the receiving device schematically shown in FIG. 4. Generally, the present invention suggest an OFDM transmission and reception of an OFDM burst with a preamble which is shortened in relation to the prior art preambles while still guaranteeing a secure synchronization on the receiving side. Hereby, the present invention suggests the use of OFDM bursts comprising a preamble part and a payload part, whereby the preamble part has a section consisting of pilot symbols mapped onto every n-th frequency subcarrier and signaling data mapped onto the frequency subcarriers between the frequency subcarriers with the pilot symbols. Hereby, n=1, 2, 3, 4, 5, 6 or more depending on the required reliability of the synchronization on the receiving side. In other words, the pilot symbols are mapped onto the frequency subcarriers in equidistant locations, whereby the distance between adjacent pilot symbols is chosen so that the interpolation on the receiving side is good enough to predict amplitude attenuation and phase shift for the signaling data placed in between. In front of the section of the preamble with the pilot symbols and the signaling data, a preceding section is located with comprises automatic gain control information for the receiving side as well as an auto-correlation pattern enabling a coarse synchronization on the receiving side.

Therefore, the transmitting device 1 of the present invention as shown in FIG. 1 comprises pilot symbol generation means 2 and signaling data generation means 3. The pilot symbol generation means 2 generates pilot symbols of a cross-correlation pattern, i.e. pilot symbols which are known on the receiving side. Any kind of known or future pilot symbols can be used. The signaling data generated by the signaling data generation means can be any kind of data containing useful information for the receiving side, i.e. information which can be used for any kind of processing. For example, the signaling data may contain identification information about the transmitting device and the receiving device or any other kind of information. This enables e.g. the re-use of a formally transmitted automatic gain control value between the transmitting device and the receiving device in a quasi-static channel. The transmitting device and receiving device identification information embedded in the signaling data are used to identify the connection, whereafter the formally used automatic gain control value can be used by the receiving side. Additionally or alternatively, the signaling data may contain information about the transmit power level. The receiving device can indicate the transmit power level to the transmitting device. Additionally or alternatively, the signaling data may contain media access control timing information. Additionally or alternatively, the signaling data may contain information about adaptive OFDM modulation. The mentioned possible contents of the signaling data are explained in detail at the end of the specification. The pilot symbols from the pilot symbol generating means 2 and the signaling data from the signaling data generating means 3 are provided to a preamble generating means 5, which is adapted to map the pilot symbols onto every n-th frequency subcarrier of the OFDM system and to map the signaling data onto the frequency subcarriers between the frequency subcarriers with the pilot symbols. The density of the pilot symbols depends on the synchronization which is to be achieved on the receiving side. It has to be ensured that the pilot symbols are placed in a density which enables an interpolation on the receiving side which is good enough to predict amplitude attenuation and phase shift for the signaling data on the frequency subcarriers in between the pilot symbols.

The transmitting device 1 further comprises means 4 for generating automatic gain control information and auto-correlation pattern for a section of the preamble which precedes the section with the pilot symbols and signaling data. Therefore, in a very basic embodiment, the preamble consists of only two sections, whereby the first section comprises automatic gain control information and an auto-correlation pattern, and the second section consists of the pilot symbols and the signaling data. Hereby, it has to be noted that the generation of the various symbols and data in the means 2, 3 and 4 of course includes the obtaining of the corresponding data or signals or information from other sources as well as the generation of the signals or data or information on site, i.e. in the transmitting device. The preamble generating means 5 generates the entire preamble for the OFDM burst, which implies that the various necessary processing steps to create a preamble for an OFDM system are being performed such as scrambling the data, forward error coding of the data, interleaving of the data, mapping of the data and OFDM modulating the data, which usually includes a fast inverse Fourier transformation. The preamble generated by the preamble generating means 5 is then supplied to an OFDM burst generating means 6, which combines the obtained preamble with payload data. The payload data are generated in or obtained through a payload data generating means 7, whereby the payload data are processed in an OFDM processing means 8 in the necessary wave for the respective communication system, e.g. by scrambling, forward error coding, interleaving, mapping and OFDM modulating the payload data. The OFDM burst generating means 6 puts the preamble and the payload data together and generates an OFDM burst, e.g. by adding guard intervals, by performing a symbol wave shaping and so forth. The generated OFDM burst is then supplied to a transmission means 9 and transmitted towards a receiving device by a corresponding interface means 10. The interface means can be any kind of wired or wireless interface. For example, in case of a wireless communication system, the interface means 10 might be an antenna. In case of a powerline communication system, the interface means 10 can be a suitable interface device for the connection to a powerline socket.

Figure 2:
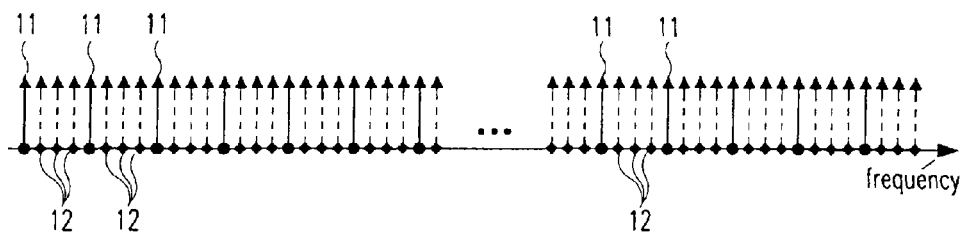

FIG. 2 schematically shows the mapping of pilot symbols 11 onto frequency subcarriers of the preamble and the mapping of signaling data 12 on frequency subcarriers between the frequency subcarriers with the pilot symbols 11 according to the present invention. In the example shown in FIG. 2, pilot symbols are mapped onto ever 4-th frequency subcarrier, so that n=4. However, any other suitable number can be used for n. As mentioned above, the density and the number of pilot symbols or in other words the distance between the equidistant pilot symbol subcarriers depends on the required density which enables a good enough synchronization on the receiving side. Hereby, it could be possible to implement a variable mapping of pilot symbols depending on the channel characteristics.

Figure 3:
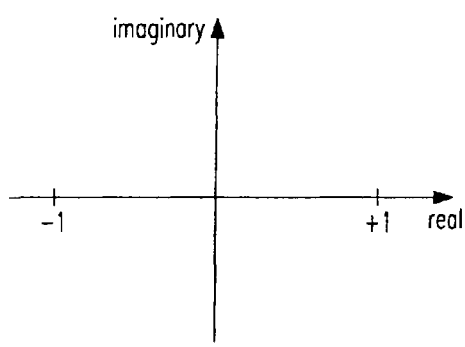

The modulation of the signaling data performed by the preamble generating means 5 must be robust enough, so that the receiving side can reliably detect the transmitted signal value. For example, as schematically shown in FIG. 3, a binary phase shift keying modulation (BPSK modulation) can be used in which the transmitted values are only '−1' and '+1'. Since the channel estimation on the receiving side for the signaling data of the discussed section of the preamble is based on an interpolation from the neighboring pilot symbols, the modulation scheme must be robust enough in order to ensure a secure detection of the transmitted values. A robust modulation scheme in this sense is a modulation scheme in which the signaling data are mapped onto 2 or 4 constellation points in the constellation scheme. For example, a BPSK, a QPSK, a QAM or any other similarly robust modulation scheme could be used. Additionally, the signaling data can be provided and secured with a forward error correction code by the preamble generating means 5 in order to increase the probability of a correct decision at the decoder of the receiving side.

Figure 4:
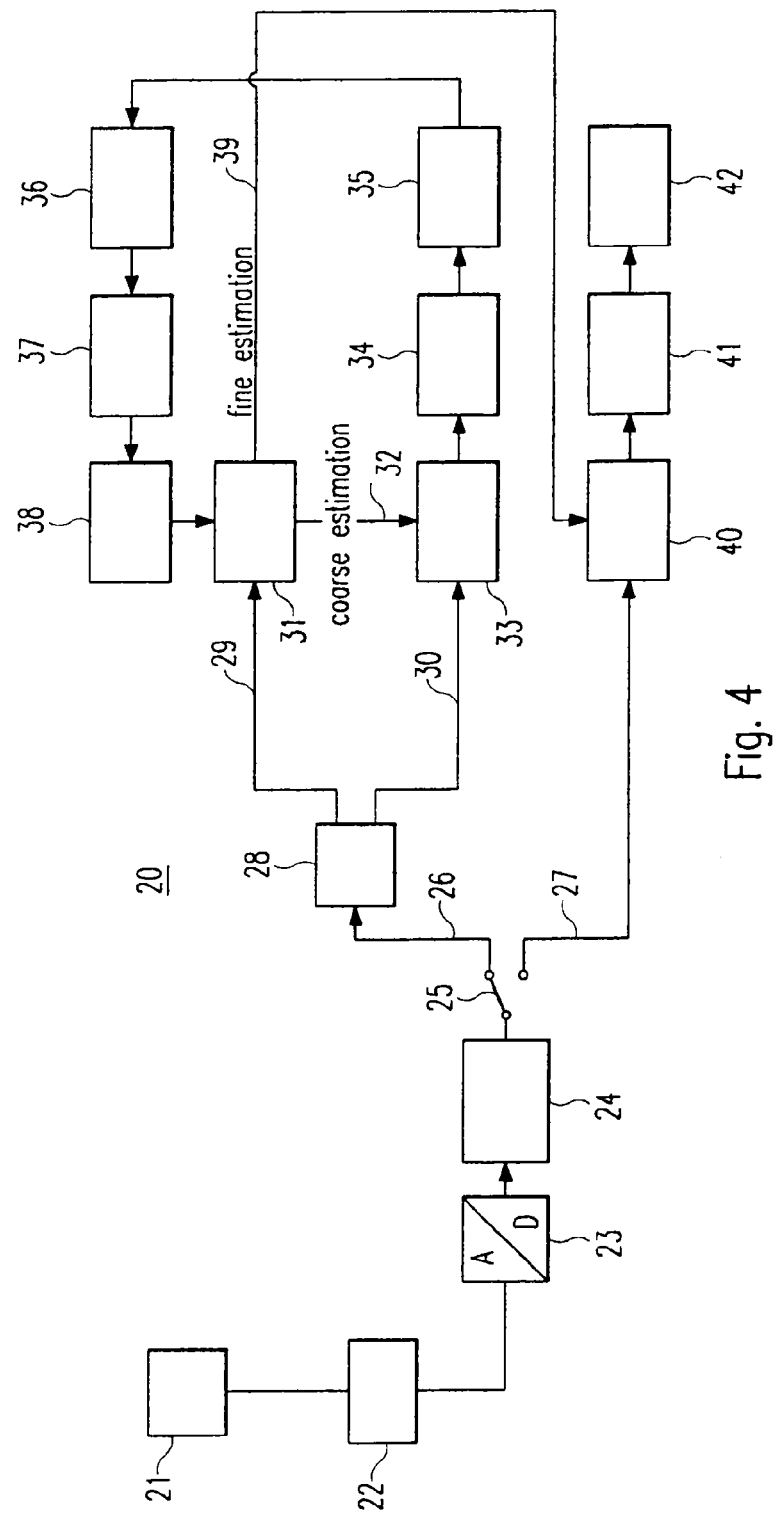

FIG. 4 shows a schematic block diagram of a receiving device 20 according to the present invention. The receiving device 20 comprises a receiving interface 21, which is connected to the wired or establishes the connection to the wireless communication system. In case of a wireless communication system, the interface means 21 is for example an antenna. In case of a powerline communication system, the interface means 21 is e.g. a suitable interface device for the connection to a powerline socket. Received OFDM bursts from the interface means 21 are processed by a receiving means 22, which performs the necessary receiving processing depending on the communication system. After an analog-to-digital conversion in a A/D means 23, a received OFDM burst is demodulated in an OFDM demodulator 24. Generally, the receiving device 20 performs all the processing necessary to obtain the data received in an OFDM burst of the corresponding communication system. However, for the sake of clarity only the elements and means necessary for understanding the present invention are shown in FIG. 4. Generally, the receiving device 20 processes an OFDM burst as for example generated and transmitted by a transmitting device 1 as shown and explained in relation to FIG. 1. As explained, the OFDM burst from the transmitting device 1 has a uniquely structured preamble in which a section consists of pilot symbols and signaling data as explained in detail above. In the transmitting device 20, after the OFDM demodulation, a received OFDM burst is separated into a preamble part and a payload part by a switch means 25. The payload part is further processed in a payload branch 27 as explained further below. The preamble part is further processed in a preamble branch 26, which comprises a carrier splitting means 28, which splits the received section of the preamble part comprising the pilot symbols and the signaling data into the pilot symbols, which are supplied via a pilot symbol branch 29 to a channel estimation means 31. The signaling data of the section of the preamble part are supplied via a signaling data branch 30 to a first channel equalization means 33.

The channel estimation means 31 is adapted to perform a first channel estimation on the basis of the received pilot symbols. The pilot symbols form a cross-correlation pattern which means that the pattern is known to the channel estimation means 31. The channel estimation means 31 performs a first (and coarse) channel estimation on the basis of said received pilot symbols and provides the result 32 of the coarse channel estimation to the first channel equalization means 33. The first channel equalization means 32 is adapted to perform a coarse channel equalization, for example by interpolation or the like, on the received signaling data, after which a symbol detection means 34 performs the symbol detection of the equalized signaling data. Thereafter, a decoding means 35 performs a forward error code decoding. This of course implies that the signaling data in the section of the preamble part are forward error coded by the preamble generating means 5 of the transmitting device 1 which transmitted the OFDM burst. The received equalized and decoded signaling data of the discussed section of the preamble part are then used to reconstruct the entire section as a training pattern for an accurate channel estimation. Therefore, the decoded signaling data from the decoding means 35 are supplied to a forward error code encoder 36, which performs the identical forward error coding as the preamble generating means 5 of the transmitting device 1. Thereafter, a symbol mapping processing is performed by a symbol mapping means 37 corresponding to the OFDM mapping and modulating performed by the preamble generating means 5 of the transmitting device 1. Thereafter, the obtained reconstructed entire section of the received preamble is used as a training pattern which is stored in a corresponding training pattern memory 38. The reconstructed training pattern is then used by the channel estimation means 31 to perform an accurate channel estimation by comparing said training pattern with the received entire section of the preamble part. The result 39 of such an accurate channel estimation is supplied to a second channel equalization means 40, which performs a channel equalization on the received payload data part. The equalized payload data parts are then processed by a symbol detection means 41 and the forward error code decoder 42 in the required manner.

The transmitting device according to the present invention, as e.g. the transmitting device 1 explained above and its elements as well as the receiving device of the present invention, such as the receiving device 20 explained above and its elements are in an advantageous embodiment adapted to transmit and receive, respectively, signals in a powerline communication system. A powerline communication system is a system which uses existing powerlines, e.g. provided in apartments, houses, buildings as well as in-between apartments, houses and buildings to transmit and receive signals through the powerlines. Such powerline communication systems are e.g. adapted to receive and transmit signals at high frequencies, such as but not limited to 0.3 to 100 MHz. OFDM is a modulation scheme which can advantageously be used in powerline communication systems.

As stated above, the signaling data can be used to transmit various kinds of data which are useful in the receiving device or for the communication between transmitting device and receiving device. For example, the signaling data may contain transmit and receive identification. In quasi-static channels, the automatic gain control value that was used by a certain connection between a transmitter and a receiver can be re-used the next time.

Transmitter and receiver identifications which are embedded in the signaling data can hereby be used to identify the connection and to re-use the automatic gain control value, which does not need to be transmitted again in this instance. Further, the signaling data may contain information about the transmit power level. Hereby, the receiving device can indicate the transmit power level to the transmitting device. Adjusting the transmit power level by the receiving device can be used to improve the coexistence or to minimize the interference to neighboring communication systems. An application of a dedicated bandwidth demand can be transmitted with a decreased power level and a lower carrier bit-loading constellations. Further, the signaling data may contain medium access control timing information, for example in centralized media access control architectures. For example, the receiver can signal preferred or disturbed time slices of a medium access control frame. This allows more flexibility in architectures in which various communication systems coexist.

Further, the signaling data may contain adaptive OFDM modulation signaling information.

Hereby, data bits in the preamble are used to signal the information of the adapted bit-loading for the OFDM carrier constellation to its communication partner. For example, some communication systems like power line communication use adaptive schemes according to the current channel conditions. OFDM as a modulation scheme that consists of many orthogonal frequency subcarriers might be extended in a way that each frequency subcarrier can be adapted to its channel characteristic. Sub-carriers with good channel conditions can be transmitted with high modulation scheme allowing a high bit rate throughput and subcarriers with bad channel conditions can be transmitted with a more robust modulation scheme resulting in a lower bit rate throughput. Additionally, subcarriers with very bad channel conditions can be left out, i.e. may not be used for data transmission. The goal of signaling the adaptive OFDM pattern in the signaling data of the preamble section is to provide a very quick evaluation of the adaptive patterns. A receiver knows by decoding the preamble section the OFDM pattern of the transmitter. On the other hand, a receiver can signal the best possible constellations for a next data block of this connection back to the transmitter.

The invention claimed is:
1. A receiver, comprising:
   circuitry configured to:
      receive signals modulated on frequency subcarriers of an orthogonal frequency division multiplexing (OFDM) communication system;

receive OFDM bursts including a preamble part and a payload data part, the preamble part including a section that includes signaling data and pilot symbols, wherein the pilot symbols are mapped onto pilot subcarriers that are every $n^{th}$ frequency subcarrier of the frequency subcarriers, where n=2 or more, and the signaling data is mapped onto signaling subcarriers that are frequency subcarriers that are between the pilot subcarriers, such that the signaling data and the pilot symbols are received at a same time;

perform a first channel estimation based on the pilot symbols, wherein the pilot symbols form a cross-correlation pattern and a distance between adjacent pilot subcarriers, in the frequency dimension, is set so that interpolation by the receiver predicts amplitude attenuation and phase shift for the signaling data;

perform a first channel equalization based on the first channel estimation to provide a coarse channel equalization that includes interpolating the signaling data to generate equalized signaling data;

perform symbol detection of the equalized signaling data and decode the equalized signaling data;

generate a reconstructed preamble part based on the decoded equalized signaling data; and perform an second channel estimation by comparing the reconstructed preamble part with the preamble part.

2. The receiver according to claim 1, wherein the circuitry is further configured to:

perform a second channel equalization on the payload data part based on the second channel estimation to generate equalized payload data; and perform symbol detection of the equalized payload data and decode the equalized payload data.

3. The receiver according to claim 1, wherein the circuitry, to perform the first channel equalization, is configured to interpolate the pilot symbols to predict amplitude attenuation and phase shift for the signaling data between adjacent pilot symbols.

4. The receiver according to claim 1, wherein the pilot symbols form a channel estimation pattern.

5. The receiver according to claim 1, wherein the signaling data includes medium access control timing information.

6. The receiver according to claim 1, wherein the pilot symbols are mapped onto every $6^{th}$ frequency subcarrier.

7. The receiver according to claim 1, wherein the preamble part further includes a second section including automatic gain control information and an auto-correlation pattern.

8. The receiver according to claim 1, wherein the preamble part includes a first section comprising automatic gain control information, and the first section is arranged, within the preamble part, to precede the section including the pilot symbols and the signaling data.

9. A method performed by a receiver device, the method comprising:

receiving signals modulated on frequency subcarriers of an orthogonal frequency division multiplexing (OFDM) communication system;

receiving OFDM bursts including a preamble part and a payload data part, the preamble part including a section that includes signaling data and pilot symbols, wherein the pilot symbols are mapped onto pilot subcarriers that are every $n^{th}$ frequency subcarrier of the frequency subcarriers, where n=2 or more, and the signaling data is mapped onto signaling subcarriers that are frequency subcarriers that are between the pilot subcarriers, such that the signaling data and the pilot symbols are received at a same time;

performing, by circuitry, a first channel estimation based on the pilot symbols, wherein the pilot symbols form a cross-correlation pattern and a distance between adjacent pilot subcarriers, in the frequency dimension, is set so that interpolation by the receiver predicts amplitude attenuation and phase shift for the signaling data;

performing, by the circuitry, a first channel equalization based on the first channel estimation to provide a coarse channel equalization that includes interpolating the signaling data to generate equalized signaling data;

performing, by the circuitry, symbol detection of the equalized signaling data and decode the equalized signaling data;

generating, by the circuitry, a reconstructed preamble part based on the decoded equalized signaling data; and performing, by the circuitry, an second channel estimation by comparing the reconstructed preamble part with the preamble part.

* * * * *